(12) United States Patent
Montgomery

(10) Patent No.: US 9,349,196 B2
(45) Date of Patent: May 24, 2016

(54) MERGING AND SPLITTING DATA BLOCKS

(71) Applicant: Red Hat, Inc., Raleigh, NC (US)

(72) Inventor: Christopher Montgomery, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/179,117

(22) Filed: Feb. 12, 2014

(65) Prior Publication Data

US 2015/0043835 A1 Feb. 12, 2015

Related U.S. Application Data

(60) Provisional application No. 61/864,429, filed on Aug. 9, 2013.

(51) Int. Cl.
| | |
|---|---|
| *G06K 9/46* | (2006.01) |
| *H04N 11/02* | (2006.01) |
| *H04N 11/04* | (2006.01) |
| *H04N 7/12* | (2006.01) |
| *H04N 1/32* | (2006.01) |
| *H04N 1/41* | (2006.01) |
| *G06T 9/00* | (2006.01) |
| *H04N 19/176* | (2014.01) |
| *H04N 19/122* | (2014.01) |
| *H04N 19/146* | (2014.01) |
| *H04N 19/48* | (2014.01) |
| *H04N 19/625* | (2014.01) |

(52) U.S. Cl.
CPC ............... *G06T 9/00* (2013.01); *H04N 19/122* (2014.11); *H04N 19/146* (2014.11); *H04N 19/176* (2014.11); *H04N 19/48* (2014.11); *H04N 19/625* (2014.11)

(58) Field of Classification Search
None
See application file for complete search history.

(56) References Cited

U.S. PATENT DOCUMENTS

| | | | | |
|---|---|---|---|---|
| 7,437,394 | B2 * | 10/2008 | Hou | G06F 17/147 708/402 |
| 7,516,064 | B2 | 4/2009 | Vinton et al. | |
| 7,707,034 | B2 | 4/2010 | Sun et al. | |
| 9,008,811 | B2 | 4/2015 | Valin | |
| 2003/0236809 | A1 * | 12/2003 | Hou | G06F 17/142 708/400 |
| 2005/0111552 | A1 * | 5/2005 | Sugio | H04N 19/139 375/240.16 |

(Continued)

FOREIGN PATENT DOCUMENTS

| | | |
|---|---|---|
| EP | 2391030 A1 | 11/2011 |
| WO | WO 2012/150942 A1 | 11/2012 |

OTHER PUBLICATIONS

Ding, Wenpeng et al., "Adaptive Directional Lifting-Based Wavelet Transform for Image Coding," Published Feb. 2007, Dept. of Comput. Sci., Univ. of Sci. & Technol. of China, http://ieeexplore.ieee.org/xpl/login.jsp?tp=&arnumber=4060933&url=http%3A%2F%2Fieeexplore.ieee.org%2Fxpls%2Fabs_all_.jsp%3Farnumber%3D4060933.

(Continued)

*Primary Examiner* — Randolph I Chu
(74) *Attorney, Agent, or Firm* — Lowenstein Sandler LLP

(57) ABSTRACT

A first set of discrete cosine transform (DCT) blocks is obtained. Each DCT block from the first set of DCT blocks has a first block size. When performing a split operation on the first set of DCT blocks, a filter is applied to the first set of DCT blocks. A second set of data blocks is generated based on the first set of DC blocks using a transform function. Each block in the second set of data blocks has a second block size. When performing a merge operation, the filter is applied to the second set of data blocks.

20 Claims, 7 Drawing Sheets

(56) References Cited

U.S. PATENT DOCUMENTS

| | | | | |
|---|---|---|---|---|
| 2006/0029282 | A1* | 2/2006 | Meeker | H04N 19/86 382/250 |
| 2006/0257036 | A1* | 11/2006 | Hou | G06F 17/147 382/250 |
| 2007/0106502 | A1 | 5/2007 | Kim et al. | |
| 2007/0156801 | A1 | 7/2007 | Guevorkian | |
| 2012/0294365 | A1* | 11/2012 | Zheng | H04N 19/176 375/240.16 |
| 2013/0076770 | A1* | 3/2013 | Cheng | G09G 5/001 345/547 |
| 2014/0212044 | A1* | 7/2014 | Savvides | G06K 9/4609 382/190 |
| 2014/0348221 | A1* | 11/2014 | Terriberry | G06F 17/147 375/240.2 |

OTHER PUBLICATIONS

Malvar, Henrique S., "Extended Lapped Transforms: Properties, Applications, and Fast Algorithms," Published Nov. 1992, Dept. of Electrical Engineering, Universidade de Brasilia, http://research.microsoft.com/pubs/102075/malvar_elt_tsp1192.pdf.

Tran, Trac D. et al., "Lapped Transform via Time-Domain Pre- and Post-Filtering," Published Jun. 2003, IEEE, http://thanglong.ece.jhu.edu/Tran/Pub/prepost.pdf.

Zielinski, Stephen J. et al., "Image Denoising Using Scale-Adaptive Lifting Schemes," Published 2000, Image Processing, 2000. Proceedings. 2000 International Conference on, http://ieeexplore.ieee.org/xpl/login.jsp?tp=&arnumber=899355&url=http%3A%2F%2Fieeexplore.ieee.org%2Fxpls%2Fabs_all.jsp%3Farnumber%3D899355.

* cited by examiner

US 9,349,196 B2

MERGING AND SPLITTING DATA BLOCKS

RELATED APPLICATIONS

This application claims priority to U.S. Provisional Patent Application No. 61/864,429, filed Aug. 9, 2013, the contents of which are hereby incorporated by reference in their entirety.

TECHNICAL FIELD

The present disclosure relates processing blocks of data, and more particularly, to merging and splitting blocks of data.

BACKGROUND

Data may be divided into blocks of data or data blocks when computing devices (e.g., desktop computers, laptop computers, tablet computers, smart phones, server computers, etc.) perform functions and/or operations on the data or use the data. For example, when generating a digital image and/or a digital, the digital image and/or digital video may be divided into data blocks (e.g., blocks of data). Various functions may be used to generate and/or process data blocks. For example, discrete cosine transform (DCT) function may be used to generate and/or process the data blocks. A DCT function may express a finite sequence of data points in terms of a sum of cosine functions oscillating at different frequencies.

BRIEF DESCRIPTION OF THE DRAWINGS

The present disclosure will be understood more fully from the detailed description given below and from the accompanying drawings of various implementations of the disclosure.

DETAILED DESCRIPTION

Data may be divided into blocks of data or data blocks when computing devices perform functions and/or operations on the data or use the data (e.g., a digital image, a digital video, and/or digital audio may be divided into blocks of data). Various functions may be used to generate and/or process data blocks. One type of function that may be used to process and/or generate data blocks is a discrete cosine transform (DCT) function. A DCT function may express a finite sequence of data points in terms of a sum of cosine functions oscillating at different frequencies. Generally, when the DCT function is used to process and/or generate DCT blocks of a certain size the DCT blocks may not be merged by simply combining adjacent DCT blocks into a larger block and may not be split by simply dividing the DCT blocks into multiple smaller DCT blocks. When DCT blocks of a different size are desired, the DCT function that was performed to obtain the original DCT blocks may be undone or reversed and a new DCT function may be performed to generate DCT blocks of the different size. This may increase the amount of time and/or may decrease efficiency when processing data (e.g., when compressing a digital image).

Described herein are mechanisms for merging multiple, smaller DCT blocks into a larger data block and/or splitting a larger DCT block into multiple, smaller data blocks. The merging and/or splitting of DCT blocks may be performed without undoing or reversing a DCT operation and performing a new DCT operation. DCT blocks may be split and/or merged using a Walsh-Hadamard Transform (WHT) function. A filter may be applied to the initial DCT block when splitting the DCT block into multiple data blocks and may be applied to a resulting data block when merging multiple DCT blocks into the resulting data block. The merged and/or split data blocks may be approximations of DCT blocks having the same size.

Figure 1A:
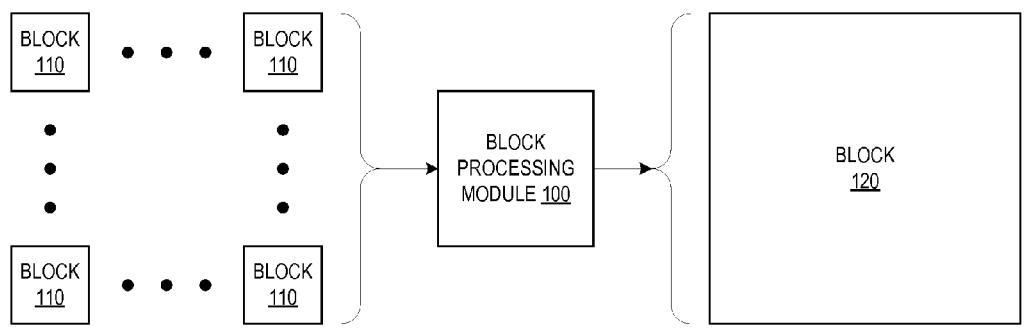
FIG. 1A is a block diagram illustrating example data blocks, in accordance with a first embodiment of the present disclosure.

FIG. 1A is a block diagram illustrating example data blocks, in accordance with a first embodiment of the present disclosure. FIG. 1A includes blocks 110 through 120 and block processing module 100. Data may be divided into blocks of data or data blocks when computing devices (e.g., desktop computers, laptop computers, tablet computers, smart phones, server computers, etc.) perform functions and/or or operations on the data or using the data. For example, when generating a digital image (e.g., a Joint Photographic Expert Group image (JPEG), etc.) and/or a digital video (e.g., a Moving Picture Experts Group video or a plurality of digital images), the digital image and/or digital video may be divided into data blocks (e.g., blocks of data). The data blocks may be processed to compress or reduce the amount of memory (e.g., hard drive space, disk space, storage space, etc.) that may be used to store the digital image and/or digital video. In another example, when generating digital audio (e.g., an MPEG-2 Audio Layer III file (MP3)), the digital audio may be divided into data blocks to compress or reduce the amount of memory that may be used to store the digital audio.

In one embodiment, a discrete cosine transform (DCT) function may be used to generate and/or process the data blocks. A DCT function may express a finite sequence of data points in terms of a sum of cosine functions oscillating at different frequencies. The use of cosine function in the DCT function may allow the DCT function to be more efficient (e.g., fewer functions are needed to approximate the input to the DCT function). The DCT function may discard high frequency terms or components when compressing or reducing the amount of data. The DCT function may also be used to performed "lossy compression" (e.g., a type of compression that compresses data by discarding or losing some of the original data that was being compressed). Different variations or types of the DCT function include, but are not limited to, the type-II DCT (often referred to as the "DCT"), the type-III DCT (often referred to as "the inverse DCT" or the "IDCT", and the modified DCT (MDCT), which may be based on a DCT of overlapping data. The DCT function may be used in various applications, including but not limited to, compressing audio data (e.g., digital audio), compressing video data (e.g., digital video) and/or compressing image data (e.g., digital images).

As discussed above, the DCT function may be used to compress image data. When image data (e.g., a digital image) is compressed using the DCT function, one or more data blocks (e.g., blocks of data) may be generated. For example, a digital image that is 8 pixels wide and 8 pixels long may be divided into four blocks of pixels that are 4 pixels wide and 4 pixels long. The DCT function may operate on the blocks of pixels (e.g., the blocks of 4×4 pixels) to generate data blocks that are 4 elements long and 4 elements wide. Each of the elements in the data blocks may be associated with (e.g., may correspond to) a pixel in the digital image. Referring to FIG. 1, a digital image may be processed using the DCT function to generate the blocks 110. The blocks 110 may also be referred to as DCT blocks (e.g., blocks of data generated using the DCT function). Each of the blocks 110 (e.g., each of the DCT blocks) may be associated with a portion of the digital image.

Generally, when the DCT function is used to process and/or generate DCT blocks (e.g., blocks 110) of a certain size (e.g., 4×4) the DCT blocks may not be merged by simply combining adjacent DCT blocks into a larger block. For example, a DCT function may process an input (e.g., an image) to generate multiple 4×4 DCT blocks. Merging four adjacent 4×4 DCT blocks into one 8×8 block is not the same as generating an 8×8 block using the DCT function on the input. Similarly, when the DCT function is used to process and/or generate DCT blocks (e.g., blocks 110) of a certain size (e.g., 8×8) the DCT blocks may not be split by simply dividing the DCT blocks into multiple smaller DCT blocks. For example, a DCT function may process an input (e.g., an image) to generate multiple 8×8 DCT blocks. Splitting an 8×8 DCT block into four 4×4 blocks is not the same as generating 4×4 blocks using the DCT function on the input. Generally, when DCT blocks of a different size are desired, the DCT function that was performed to obtain the original DCT blocks may be undone or reversed and a new DCT function may be performed to generate DCT blocks of the different size. The DCT function may use multiply operations (e.g., multiplication) to generate the DCT blocks. This may increase the amount of time and/or may decrease efficiency when processing data (e.g., when compressing a digital image) and/or generating data blocks.

In one embodiment, a block processing module 100 may combine a set of blocks 110 (e.g., DCT blocks) to generate a larger block 120. For example, each of the blocks 110 may be 4×4 blocks. The block processing module 100 may combine four adjacent 4×4 blocks to generate block 120 which may be an 8×8 block. The block 120 may be generated without using the DCT function. For example, the block processing module may not undo or reverse the DCT function performed on the blocks 110 and may not perform another DCT function to generate the block 120.

In one embodiment, the block processing module 100 may use a Walsh-Hadamard Transform (WHT) function to generate the block 120. A WHT function may an orthogonal, symmetric, involutional, linear operation on real or complex numbers. The WHT function may use a $2^m \times 2^m$ matrix that generates or outputs $2^m$ real numbers using an input of $2^m$ real numbers. In one embodiment, the WHT function may be thought of as being built out of size-2 discrete Fourier transforms (DFTs). The WHT function may decompose an arbitrary input vector into a superposition of Walsh functions. The WHT function is discussed in more detail below in conjunction with FIG. 2. The block processing module 100 may also apply one or more filters to the block 120 after the block 120 is generated using the WHT function. For example, rows and/or columns of elements (or values) in the block 120 may be modified or adjusted after the block 120 is generated using the WHT function. The filters are discussed in more detail below in conjunction with FIG. 2. The one or more filters may also be referred to as lifting filters. In one embodiment, lifting filters may work in a series of serial steps from a set of operations (e.g., adding, multiplying, dividing, etc.). The operations of a lifting filter may be reversible.

As discussed above, the blocks 110 may be a set of DCT blocks. Each of the blocks 110 may have a first size (e.g., 4×4). The block 120 may have a second size (e.g., 8×8). The block 120 may approximate a DCT block having the second size (e.g., 8×8) that is generated from the same input used to generate the blocks 110. For example, image data (e.g., a digital image) may be processed using the DCT function to generate the blocks 110 (e.g., a set of DCT blocks) having the first size (e.g., 4×4). The DCT function used to generate the blocks 110 may be reversed or undone to obtain the original image data. The original image data may be used to generate a DCT block having the second size (e.g., 8×8). The block 120 may be an approximation of the DCT block having the second size if the DCT block had been generated by reversing or undoing the DCT functions performed on the blocks 110. Because the block 120 may be an approximation of a DCT block having the same size (e.g., the block 120 may have values similar or identical to a DCT block having the same size), the block processing module 100 may able to combine the blocks 110 into a larger block 120 without reversing or undoing the DCT functions used to generate the blocks 110. This may allow the block processing module 100 to process and/or generate data blocks more quickly and/or more efficiently. In one embodiment, the block processing module may generate the block 120 without using multiply operations (e.g., without using multiplication on the data or elements in the blocks 110).

In other embodiments, the blocks 110 and the block 120 may have various sizes. For example, the blocks 110 may be 8×8 blocks and the block 120 may be a 32×32 block. In another example, the blocks 110 may be 2×2 blocks and the block 120 may be a 64×64 block. In addition, although FIG. 1A illustrates that the block processing module 100 generates block 120 (e.g., one data block), in other embodiments, the block processing module 100 may generate a second set of blocks (e.g., a second set of data blocks) based on the blocks 110 (e.g., based on the first set of DCT blocks). For example, there may be sixteen blocks 110 that may each have a size of 2×2 and the block processing module may generate four 4×4 blocks. Although the block sizes illustrated herein may be in powers of two, it should be understood that other block sizes may be used. For example, 3×3 blocks may be used or 11×11 blocks may be used.

Although the present disclosure may refer to processing and/or compressing image data, the embodiments described herein may be used in various situations. For example, the embodiments described herein may be used when processing and/or compressing audio data. In another example, the embodiments described herein may be used when processing and/or compressing video data. In a further example, the embodiments described herein may be used for signal processing.

Figure 1B:
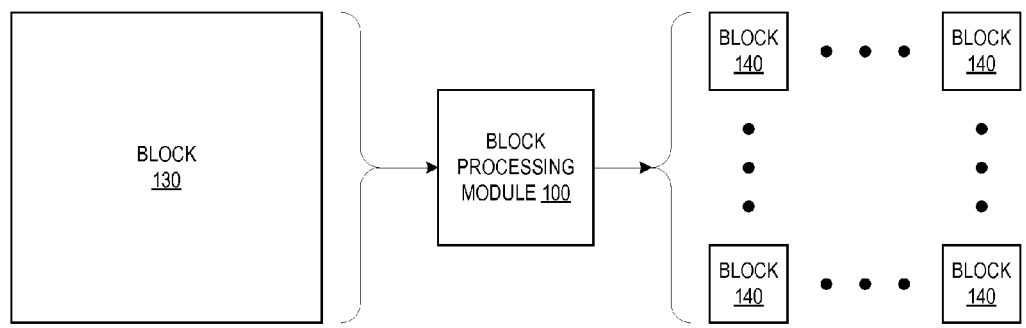
FIG. 1B is a block diagram illustrating example data blocks, in accordance with a second embodiment of the present disclosure.

FIG. 1B is a block diagram illustrating example data blocks, in accordance with a second embodiment of the present disclosure. FIG. 1A includes blocks 130 through 140 and block processing module 100. As discussed above, data may be divided into blocks of data or data blocks when computing devices perform functions and/or operations on the data or using the data. For example, when generating a digital image (e.g., a JPEG) and/or a digital video (e.g., an MPEG), the digital image and/or digital video may be divided into data blocks (e.g., blocks of data). The data blocks may be processed to compress or reduce the amount of memory that may be used to store the digital image and/or digital video. The DCT function may be used to compress image or video data. When the DCT function is used to process and/or generate DCT blocks (e.g., block 130) of a certain size (e.g., 4×4) the DCT blocks may not be merged by simply combining adjacent DCT blocks into a larger block and/or may not be split by simply dividing the DCT blocks into multiple smaller DCT blocks. Generally, when DCT blocks of a different size are desired, the DCT function that was performed on the original DCT blocks may be undone or reversed and a new DCT function may be performed to generate DCT blocks of the different size. This may increase the amount of time and/or may decrease efficiency when processing data (e.g., when compressing a digital image).

In one embodiment, a block processing module 100 may split or divide block 130 (e.g., a DCT block) to generate blocks 140 (e.g., multiple data blocks). For example, block 130 may be an 8×8 DCT block. The block processing module 100 may divide or split the block 130 to generate blocks 140 which may be four adjacent 4×4 blocks. The blocks 140 may be generated without using the DCT function. For example, the block processing module may not undo or reverse the DCT function performed on the block 130 and may not perform another DCT function to generate the block 140.

In one embodiment, the block processing module 100 may use a Walsh-Hadamard Transform (WHT) function to generate the blocks 140. As discussed above, the WHT function may use a $2^m \times 2^m$ matrix that generates or outputs $2^m$ real numbers using an input of $2^m$ real numbers. The WHT function is discussed in more detail below in conjunction with FIG. 2. The block processing module 100 may also apply one or more filters to the block 130 before generating the blocks 140 using the WHT function. For example, rows and/or columns of elements (or values) in the block 130 may be modified or adjusted before the block 130 is used to generate the blocks 140 using the WHT function. The lifting filters are discussed in more detail below in conjunction with FIG. 3.

As discussed above, the block 130 may be a DCT blocks. The block 130 may have a first size (e.g., 8×8). The blocks 140 may have a second size (e.g., 4×4). The blocks 140 may approximate DCT blocks having the second size (e.g., 8×8) that is generated from the same input used to generate the block 130. For example, image data (e.g., a digital image) may be processed using the DCT function to generate the block 130 (e.g., a DCT block) having the first size (e.g., 8×8). The DCT function used to generate the block 130 may be reversed or undone to obtain the original image data. The original image data may be used to generate multiple DCT blocks having the second size (e.g., 4×4). The blocks 140 may be approximations of the DCT blocks having the second size if the DCT block had been generated by reversing or undoing the DCT functions performed on the block 130. Because the blocks 140 may be approximations of a DCT block having the same size (e.g., the block 140 may have values similar or identical to a DCT block having the same size), the block processing module 100 may able to split or divide the larger block 130 into multiple, smaller blocks 140 without reversing or undoing the DCT functions used to generate the block 130.

This may allow the block processing module 100 to process and/or generate data blocks more quickly and/or more efficiently. In one embodiment, the block processing module may generate the blocks 140 without using multiply operations (e.g., without using multiplication on the data or elements in the block 130).

In other embodiments, the block 130 and the block 140 may have various sizes. For example, the block 130 may be a 64×64 and the blocks 140 may be 8×8 blocks. In another example, the block 130 may be a 16×16 block and the blocks 140 may be 4×4 blocks. In addition, although FIG. 1B illustrates that the block processing module 100 uses block 130 (e.g., one DCT block) to generate the blocks 140, in other embodiment, the block processing module 100 may use multiple blocks (e.g., a set of DCT blocks) to generate the blocks 140 (e.g., based on the first set of DCT blocks). Although the present disclosure may refer to processing and/or compressing image data, the embodiments described herein may be used in various situations. For example, the embodiments described here may be used when processing and/or compressing audio data.

Figure 2:
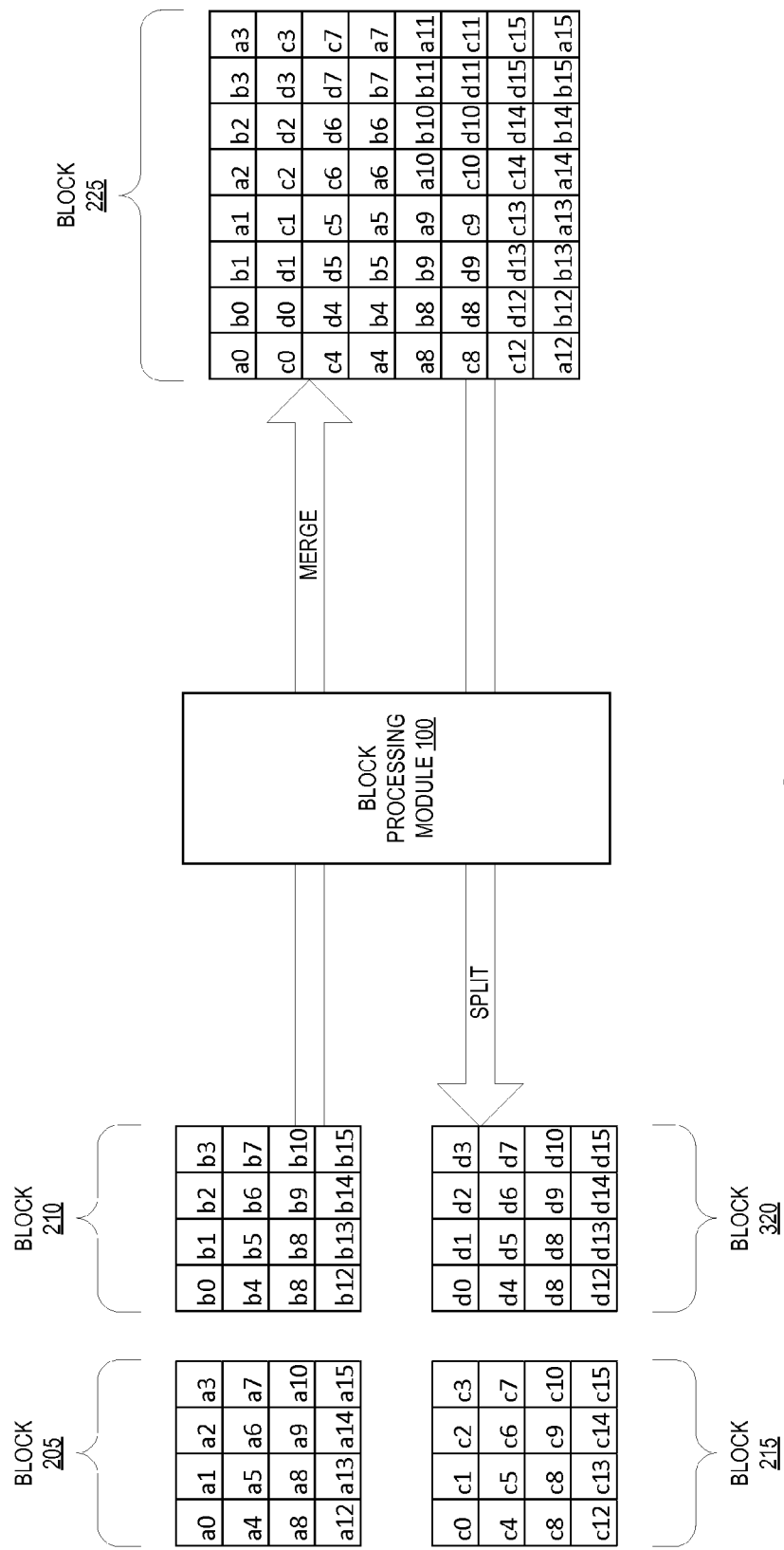
FIG. 2 is a block diagram illustrating example data blocks, in accordance with a third embodiment of the present disclosure.

FIG. 2 is a block diagram illustrating example data blocks, in accordance with a third embodiment of the present disclosure. FIG. 2 includes blocks 205 through 225 and block processing module 100. As discussed above (in conjunction with FIGS. 1A and 1B), a first set of DCT blocks may be processed to generate a larger data block that approximates a DCT having the same size as the larger data block. For example, as illustrated in FIG. 2, the blocks 205, 210, 215, and 220 may be merged or combined by the block processing module 100 to generate the block 225. Also as discussed above (in conjunction with FIGS. 1A and 1B), a larger DCT block may be processed to generate multiple smaller data blocks that approximate DCT blocks having the same size as the smaller data blocks. For example, as illustrated in FIG. 2, the block 225 may be split or divided by the block processing module 100 to generate the blocks 205, 210, 215, and 220. The block 205 includes elements a0 through a15, the block 210 includes elements b0 through b15, the block 215 includes elements c0 through c15, and the block 220 includes elements d0 through d15. The block 225 includes elements a0 through a15, b0 through b15, c0 through c15, and d0 through d15. The elements of the blocks 205, 210, 215, and 220 may also be referred to as coefficients. The blocks 205 through 220 may be DCT blocks when the block processing module 100 merges or combines the blocks 205 through 220 into the block 225. The block 225 may be a DCT block when the block processing module 100 splits or divides the block 225 into the blocks 205 through 220.

FIG. 2 may illustrate how the elements of the blocks 205 through 220 are rearranged to generate the block 225 and vice versa. For example, the element a0 of block 205 is in the first column and first row of the block 225, element a1 of block 205 is in the fourth column and first row of the block 225, etc. In one embodiment, the block processing module 100 may use the WHT function when generating block 225 (e.g., combining or merging blocks 205 through 220 to generate block 225) and/or when generating blocks 205 through 220 (e.g., splitting or dividing block 225 to generate blocks 205 through 220). For example, the block processing module 100 may use the WHT function on the elements in the blocks 205 through 220 when rearranging the elements of the blocks 205 through 220 into the block 225. In another example, the block processing module 100 may use the WHT function on the elements in the block 225 when rearranging of the block 225 into the blocks 20 through 220.

In one embodiment, WHT function may be implemented according to the following equations.

$$b = a - b \quad (1)$$

$$c = c + d \quad (2)$$

$$e = (c - b)/2 \quad (3)$$

$$a = a + e \quad (4)$$

$$d = d - e \quad (5)$$

$$c = a - c \quad (6)$$

$$b = b - d \quad (7)$$

In one embodiment, the WHT may be defined recursively in a matrix notation starting with a 1×1 WHT (H)=[1]. Based on the 1×1 WHT (H), a $2^m \times 2^m$ ($H_m$) may be defined using equation (14) below.

$$H_m = \frac{1}{\sqrt{2}} \begin{pmatrix} H_{m-1} & H_{m-1} \\ H_{m-1} & -H_{m-1} \end{pmatrix} \quad (14)$$

In one embodiment, the WHT may use four elements from the blocks 205, 210, 215, and 220 to generate four elements of the block 225 when merging and/or combining the blocks 205 through 220. For example, equations 1 through 7 may be used on the elements a0, b0, c0, and d0, to generate the elements a0, b0, c0, and d0, of block 225. In another example, equations 1 through 7 may be used on the elements a1, b1, c1, and d1, to generate the elements a1, b1, c1, and d1, of block 225. In another embodiment, the WHT may use four elements from the block 225 to generate four elements of the blocks 205, 210, 215, and 220 when splitting and/or dividing the block 225. For example, the equations 1 through 7 may be sued on the elements a0, b0, c0, and d0, of block 225 to generate the elements a0, b0, c0, and d0, of blocks 205 through 220. In another example, the equations 1 through 7 may be sued on the elements a1, b1, c1, and d1, of block 352 to generate the elements a1, b1, c1, and d1, of blocks 205 through 220.

Figure 3:
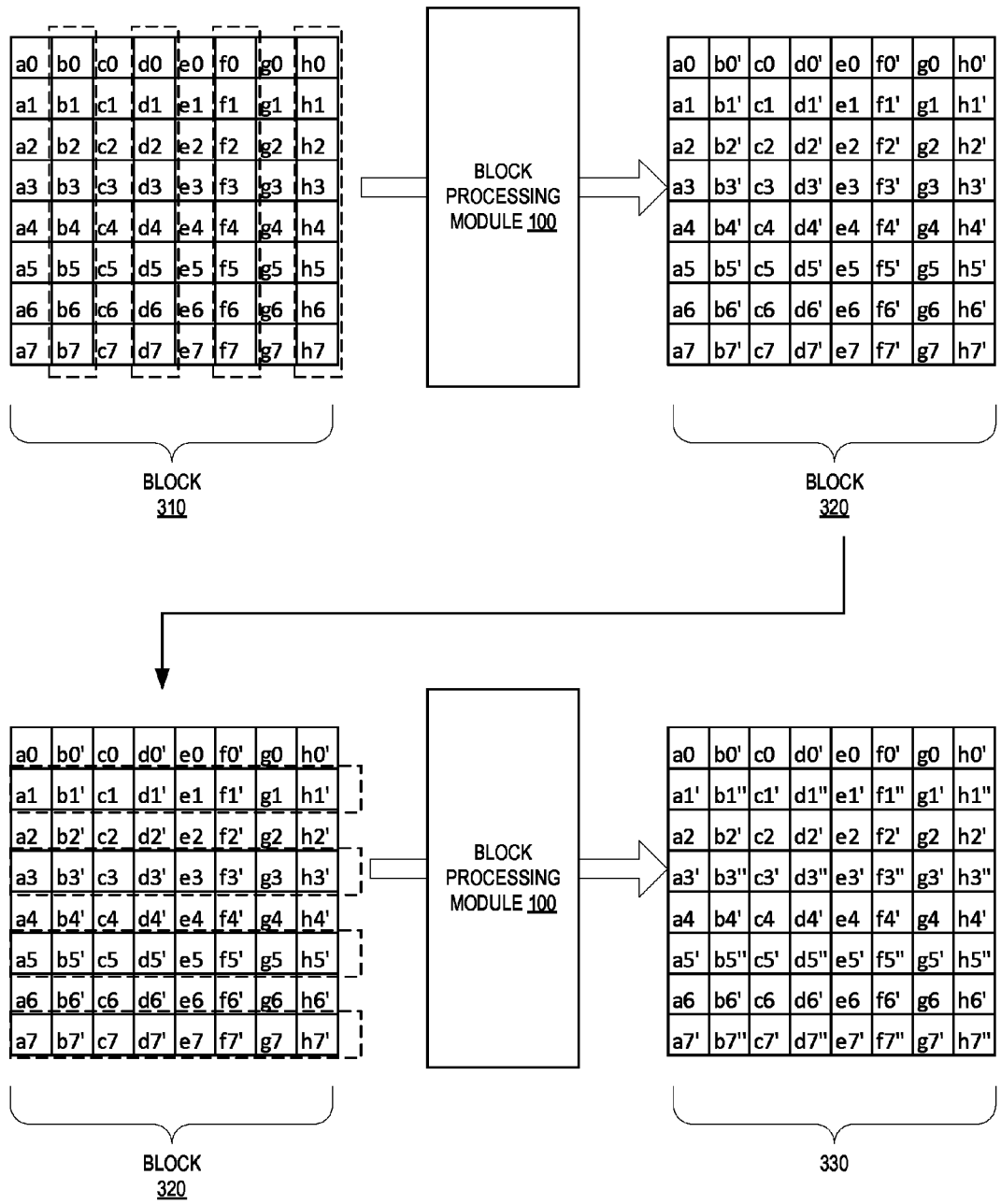
FIG. 3 is a block diagram illustrating example data blocks, in accordance with a fourth embodiment of the present disclosure.

FIG. 3 is a block diagram illustrating example data blocks, in accordance with a fourth embodiment of the present disclosure. FIG. 3 includes blocks 310, 320, 330 and block processing module 100. Each of the blocks 310 through 330 includes rows 0 through 7 and includes columns 0 through 7. As discussed above, a first set of DCT blocks may be processed by the block processing module 100 to generate a larger data block that approximates a DCT having the same size as the larger data block (e.g., the block processing module 100 may merge multiple DCT blocks into a larger data block). When the block processing module 100 merges DCT blocks into a larger data block, the block processing module 100 may apply a filter to the elements of the larger data block. For example, referring back to FIG. 3, when the block processing module 100 generates the block 310 by merging or combining multiple DCT blocks (as illustrated in FIGS. 1A, 1B, and 2), the block processing module 100 may apply a filter to the block 310. The filter may update and/or modify one or more elements of the block 310 (as discussed below). Also as discussed above, a larger DCT block may be processed to generate multiple smaller data blocks that approximate DCT blocks having the same size as the smaller data blocks. When the block processing module 100 splits or divides a DCT block into a multiple data blocks, the block processing module 100 may apply a filter to the elements of the DCT block before splitting or dividing the DCT block. For example, referring back to FIG. 3, before the block processing module 100 splits the block 310 into multiple, smaller data blocks (as illustrated in FIGS. 1A, 1B, and 2), the block processing module 100 may apply a filter to the block 310. The filter may update and/or modify one or more elements of the block 310 (as discussed below).

In one embodiment, the filter may be implemented according to the following equations:

$$b = b + (d/2) \quad (8)$$

$$d = d - (b/2) \quad (9)$$

$$d = d + (f/2) \quad (10)$$

$$f = f - (d/2) \quad (11)$$

$$f = f + (h/2) \quad (12)$$

$$h = h - (f/2) \quad (13)$$

As illustrated in FIG. 3, the block processing module 100 may apply the filter to the odd columns (e.g., columns 1, 3, 5, and 7) of the block 310 (e.g., to the columns that include elements b0 through b7, d0 through d7, f0 through f7, and h0 through h7). Each of the elements in the odd columns in the block 310 is modified and/or updated using equations 8 through 13. For example, elements b0, d0, f0, and h0 are updated or modified to the values b0', d0', f0', and h0' using equations 8 through 13, elements b1, d1, f1, and h1 are updated or modified to the values b1', d1', f1', and h1' using equations 8 through 13, elements b2, d2, f2, and h2 are updated or modified to the values b2', d2', f2', and h2' using equations 8 through 13, etc. The block processing module 100 may apply the filter (e.g., the equations 8 through 13) to the odd columns of the block 310 to generate the block 320.

After generating the block 320, the block processing module 100 may apply the filter to the odd rows (e.g., rows 1, 3, 5, and 7) of the block 320 (e.g., to the rows that include elements a1 through h1, a3 through h3, a5 through h5, and a7 through h7). Each of the elements in the odd rows of the block 320 is modified and/or updated using equations 8 through 13. For example, elements a1, a3, a5, and a7 are updated or modified to the values a1', a3', a5', and a7' using the equations 8 through 13, elements b1', b3', b5', and b7' are updated or modified to the values b1", b3", b5", and b7", elements c1, c3, c5, and c7 are updated or modified to the values c1', c3', c5', and c7', elements d1', d3', d5', and d7' are updated or modified to the values d1", d3", d5", and d7", etc. When applying the filter to the odd rows of the block 320, the block processing module 100 may use the value X1 instead of b, X3 instead of d, x5 instead of f, and x7 instead of h, where "X" may range from "a" through "h." For example, when updating or modifying elements a1, a3, a5, and a7 using the equations 8 through 13, a1 is used instead of b, a3 is used instead of d, a5 is used instead of f, and a7 is used instead of h. The block processing module 100 may apply the filter (e.g., the equations 8 through 13) to the odd rows of the block 320 to generate the block 330.

Figure 4:
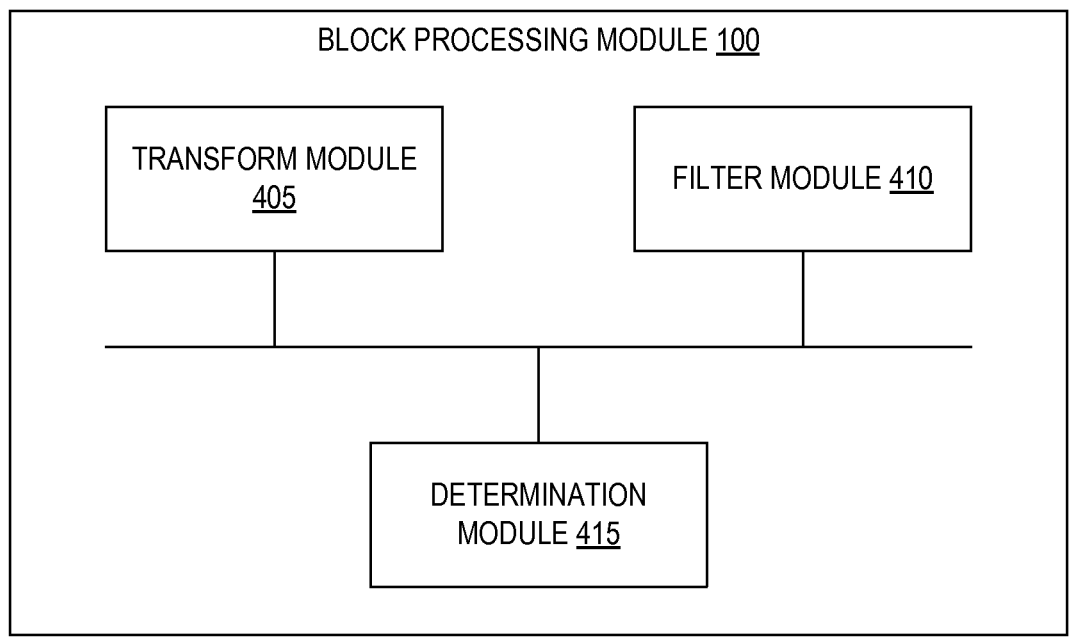
FIG. 4 is a block diagram illustrating a block processing module, in accordance with one embodiment of the present disclosure.

FIG. 4 is a block diagram illustrating a block processing module 100, in accordance with one embodiment of the present disclosure. The block processing module 100 includes a transform module 405, a filter module 410, and a determination module 415. More or less components may be included in the block processing module 100 without loss of generality. For example, two of the modules may be combined into a single module, or one of the modules may be divided into two or more modules. In one embodiment, one or more of the modules may reside on different computing devices (e.g., different server computers). The block processing module 100 may be processing logic that comprises hardware (e.g., circuitry, dedicated logic, programmable logic, microcode, etc.), software (e.g., instructions run on a processor to perform hardware simulation), or a combination thereof.

In one embodiment, the determination module 415 may determine whether the block processing module 100 is merging (or combining) multiple DCT blocks into a larger data block or splitting (e.g., dividing) a larger DCT block into multiple, smaller data blocks. For example, the determination module 415 may receive user input from a user (e.g., via a command line or via a graphical user interface (GUI)) indicating whether the block processing module 100 should perform a merge operation (e.g., merge multiple DCT blocks into a larger data block) or should perform a split operation (e.g., split a larger DCT block into multiple, smaller data blocks). In another example, the determination module 415 may analyze a first set of DCT blocks to determine whether to perform the merge operation or a split operation. For example, if the first set of DCT blocks has one DCT block, the determination module 415 may determine that the DCT block should be split (e.g., divided) into multiple, smaller data blocks. If the first set of data blocks has multiple DCT blocks, the determination module 415 may determine that the multiple DCT blocks should be merged (e.g., combined) into a larger data block.

In one embodiment, the transform module 405 may rearrange a first set of DCT blocks into a second set of data blocks. For example, as illustrated in FIG. 2, the transform module 405 may receive multiple DCT blocks and may rearrange the elements of the DCT blocks into a data block (e.g., into a set of data blocks that includes one data block). In another example, as illustrated in FIG. 2, the transform module 405 may receive a single DCT block (e.g., a first set of DCT blocks that includes a single DCT block) and may rearrange the elements of the single DCT block into multiple data blocks. As discussed above in conjunction with FIG. 2, the transform module 405 may use a WHT function when rearranging the first set of DCT blocks into the second set of data blocks. The WHT function may be implemented according to equations 1 through 7 (as discussed above in conjunction with FIG. 2).

In one embodiment, filter module 410 may apply a filter to the first set of DCT blocks or the second set of data blocks. The filter may modify (or update) the elements in the columns of the first set of DCT blocks or the second set of data blocks (as discussed above in conjunction with FIG. 3) and may also modify (or update) the elements in the rows of the first set of DCT blocks or the second set of data blocks (as discussed above in conjunction with FIG. 3). The filter may be implemented according to equations 8 through 13, as discussed above in conjunction with FIG. 3.

In one embodiment, when the determination module 415 determines that the block processing module 100 should perform a merge operation (e.g., combine or merge multiple DCT blocks into a larger data block), the transform module 405 may generate the larger data block and the filter module 410 may apply the filter to the larger data block generated by the transform module 405. For example, referring to FIG. 2, when the determination module 415 determines that the block processing module 100 should perform a merge operation, the transform module 405 may generate the block 225 from the blocks 205 through 220 (e.g., a set of DCT blocks) and the filter module 410 may apply the filter to some of the rows and columns of the block 225.

In another embodiment, when the determination module 415 determines that the block processing module 100 should perform a split operation (e.g., divide or split a larger DCT block into multiple, smaller data blocks), the filter module 410 may apply the filter to the larger DCT block and the transform module 405 may generate the multiple, smaller data blocks using the larger DCT block after the filter module 410 applies the filter to the larger DCT block. For example, referring to FIG. 2, when the determination module 415 determines that the block processing module 100 should perform a split operation, the filter module 410 may first apply the filter to some of the rows and columns of the block 225 and the transform module 405 may generate the block 225 from the blocks 205 through 220.

Figure 5:
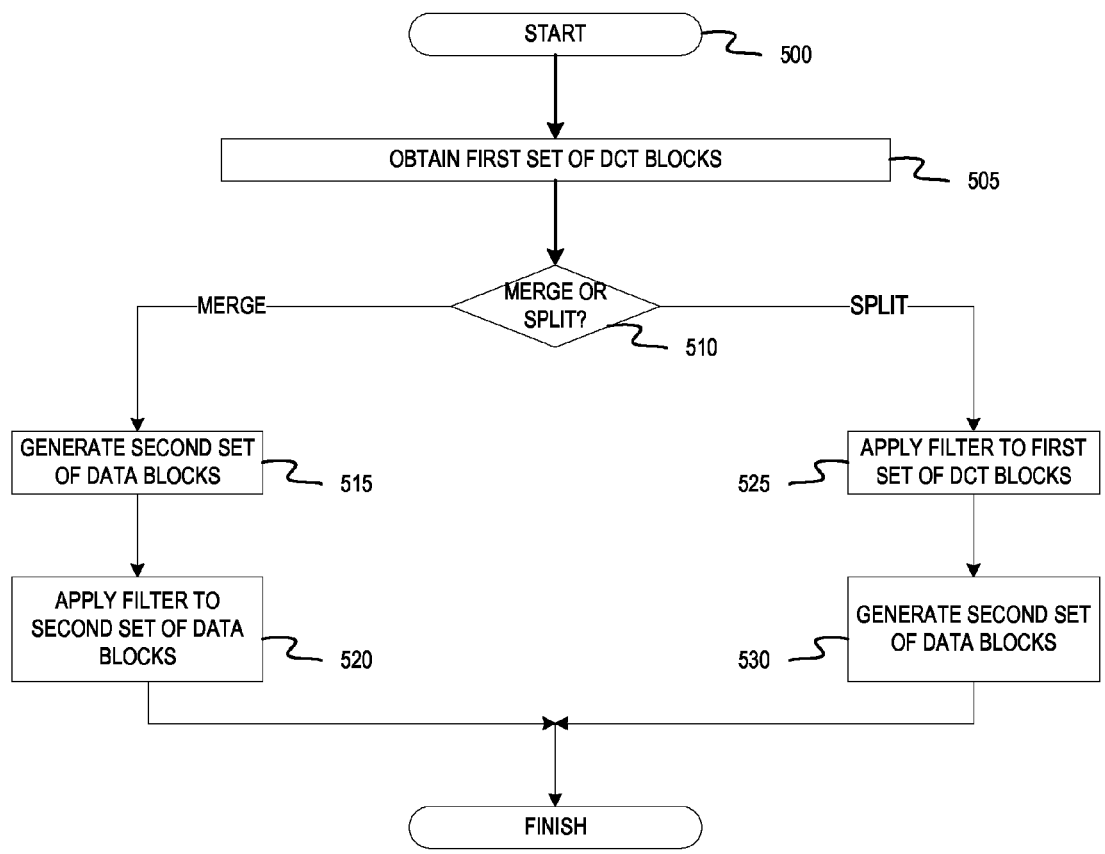
FIG. 5 is a flow diagram illustrating an implementation for a method of merging and/or splitting data blocks, in accordance with one embodiment of the present disclosure.

FIG. 5 is a flow diagram illustrating an implementation for a method 500 of merging and/or splitting data blocks. For simplicity of explanation, the method 500 is depicted and described as a series of acts. However, acts in accordance with this disclosure can occur in various orders and/or concurrently and with other acts not presented and described herein. Furthermore, not all illustrated acts may be required to implement the method 500 in accordance with the disclosed subject matter. In addition, those skilled in the art will understand and appreciate that the method 500 could alternatively be represented as a series of interrelated states via a state diagram or events. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a block processing module, as illustrated in FIGS. 1A, 1B, 2, 3, and 4.

Referring to FIG. 5, the method 500 begins at block 505 where the processing logic obtains a first set of DCT blocks. The first set of DCT blocks may include one or more DCT blocks (e.g., blocks of data generated using a DCT function) and the one or more DCT blocks may have a first size. At block 510, the processing logic determines whether a merge operation or a split operation should be performed. For example, as discussed above in conjunction with FIG. 4, the processing logic may receive user input and/or may analyze the number of blocks in the first set of DCT blocks to determine whether to perform a merge operation or a split operation.

If a merge operation is to be performed, the processing logic may generate a second set of data blocks based on the first set of DCT blocks. For example, the first set of DCT blocks may include multiple DCT blocks and the processing logic may rearrange elements from the multiple DCT blocks into a larger data block (e.g., into a set of data blocks that one data block). The processing logic proceeds to block 515 where the processing logic may use a WHT transform on the elements of the multiple DCT blocks when generating the larger data blocks (as discussed above in conjunction with FIG. 2). The WHT transform may be implemented using equations 1 through 7 (as discussed above in conjunction with FIG. 2). At block 520, the processing logic applies a filter to the larger data block. For example, as illustrated in FIG. 3), the processing logic may apply a filter to the some of the columns of the larger data block (e.g., the odd columns) and may apply the filter to some of the rows of the larger data block (e.g., the odd rows). As discussed above in conjunction with FIGS. 1A and 1B, because the larger may be an approximation of a DCT block having the same the processing logic may able to combine the multiple DCT blocks into a larger data block without reversing or undoing the DCT functions used to generate the multiple DCT blocks. After block 520, the method 500 ends.

If a split operation is to be performed, the processing logic applies a filter to the first set of DCT blocks at block 525 (e.g., applies a filter to a first set of DCT blocks that includes a single DCT block). For example, as illustrated in FIG. 3, the processing logic may apply a filter to the some of the columns of the single DCT block (e.g., the odd columns) and may apply the filter to some of the rows of the single DCT block (e.g., the odd rows). At block 530, the processing logic generates a second set of data blocks based on the first set of DCT blocks. For example, the first set of DCT blocks may include a single DCT block and the processing logic may rearrange elements from the single DCT block into multiple, smaller data blocks. The processing logic may use a WHT transform on the elements of the single DCT block when generating the multiple data blocks (as discussed above in conjunction with FIG. 2). The WHT transform may be implemented using equations 1 through 7 (as discussed above in conjunction with FIG. 2). Because the multiple, smaller data blocks may be approximations of DCT blocks having the same size, the processing logic may able to split or divide the single DCT block into multiple, smaller data blocks without reversing or undoing the DCT functions used to generate the single DCT block. After block 530, the method 500 ends.

Figure 7:
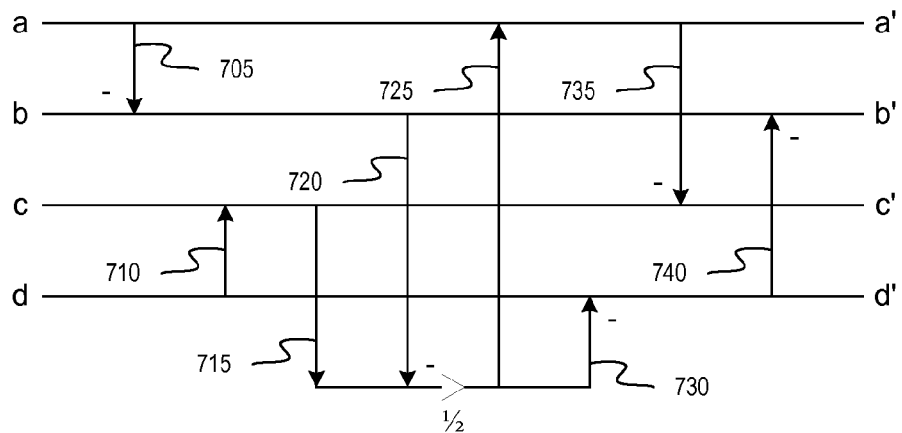
FIG. 7 is a diagram illustrating a lifting scheme for a Walsh-Hadamard Transform (WHT), in accordance with one embodiment of the present disclosure.

FIG. 7 is a diagram illustrating a lifting scheme 700 for a Walsh-Hadamard Transform (WHT), in accordance with one embodiment of the present disclosure. The lifting scheme 700 includes steps 705 through 740. The lifting scheme 700 may perform the operations indicated in equations (1)-(7) to implement a WHT. The steps 705 through 740 may correspond to the equations (1)-(7). Step 705 may correspond to equation (1). Step 710 may correspond to equation (2). Steps 715 and 720 may correspond to equation (3). Step 725 may correspond to equation (4). Step 730 may correspond to equation (5). Step 735 may correspond to equation (6). Step 740 may correspond to equation (7).

Figure 8:
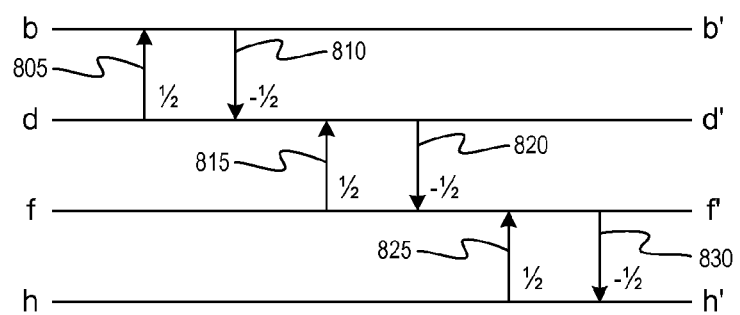
FIG. 8 is a diagram illustrating a lifting scheme for a filter, in accordance with one embodiment of the present disclosure.

FIG. 8 is a diagram illustrating a lifting scheme 800 for a filter, in accordance with one embodiment of the present disclosure. The lifting scheme 800 includes steps 805 through 830. The lifting scheme 800 may perform the operations indicated in equations (8)-(13) to implement the filter. The steps 805 through 840 may correspond to the equations (1)-(8). Step 805 may correspond to equation (8). Step 810 may correspond to equation (9). Step 815 may correspond to equation (10). Step 820 may correspond to equation (411). Step 825 may correspond to equation (12). Step 830 may correspond to equation (13).

Figure 6:
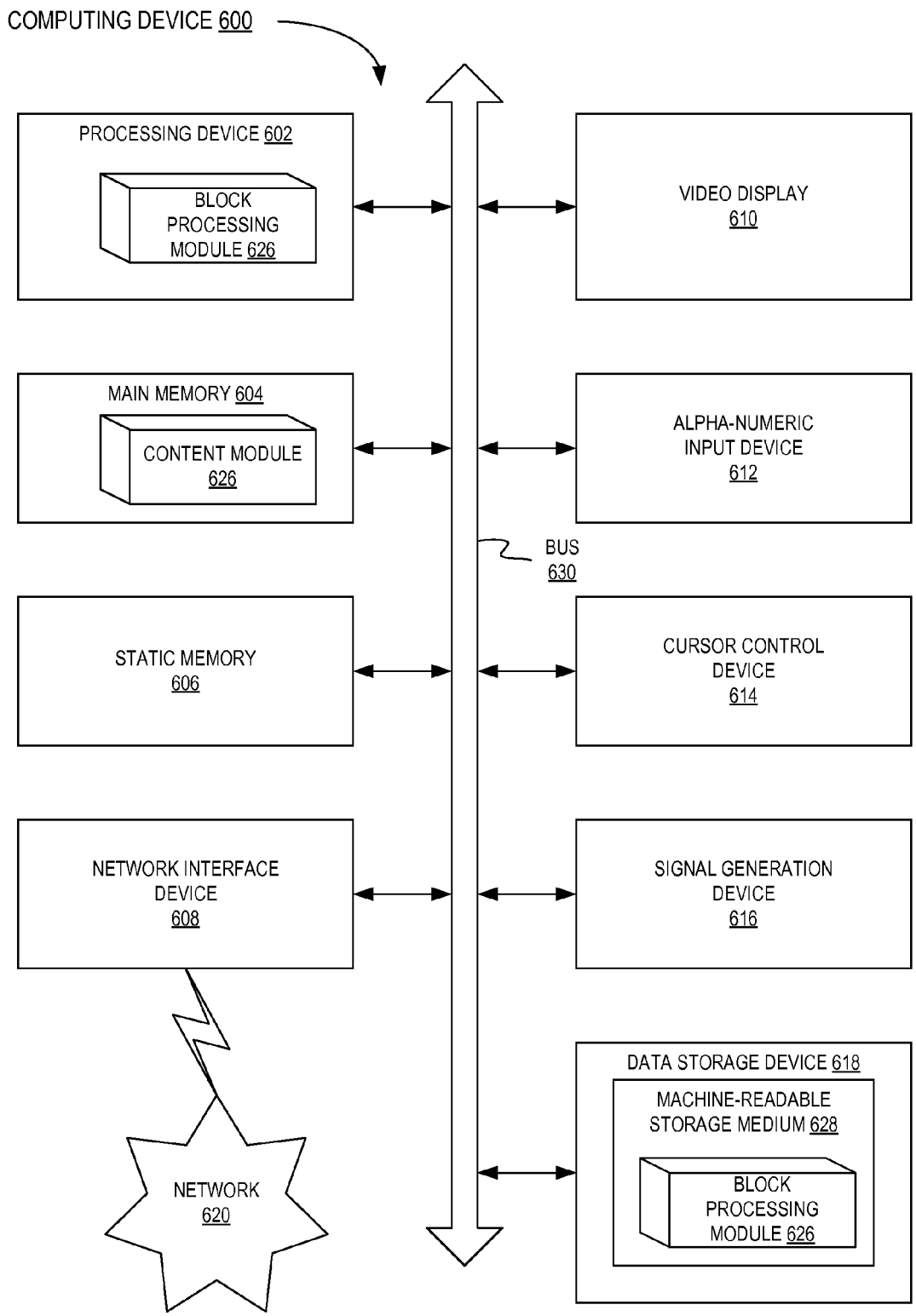
FIG. 6 is a block diagram of an example computer system that may perform one or more of the operations described herein.

FIG. 6 illustrates a diagrammatic representation of a machine in the example form of a computing device 600 within which a set of instructions, for causing the machine to perform any one or more of the methodologies discussed herein, may be executed. The computing device 600 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute block processing module 626 for performing the operations and steps discussed herein.

The computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one embodiment, the video display unit 610, the alphanumeric input device 612, and the cursor control device 614 may be combined into a single component or device (e.g., an LCD touch screen).

The data storage device 618 may include a computer-readable storage medium 628 on which is stored one or more sets of instructions (e.g., block processing module 626) embodying any one or more of the methodologies or functions described herein. The block processing module 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 620 via the network interface device 608.

While the computer-readable storage medium 628 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, registers, optical media, and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining," "determining," "applying," "generating," "modifying," "rearranging," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    obtaining a first set of discrete cosine transform (DCT) blocks of a digital image, each DCT block from the first set of DCT blocks having a first block size;
    determining, by a processing device, whether to perform a merge operation or a split operation on the first set of DCT blocks;
    applying, by the processing device, a filter to the first set of DCT blocks in response to determining that the split operation is to be performed;
    generating, by the processing device, using a transform function, a second set of data blocks in view of the first set of DCT blocks, each data block from the second set of data blocks having a second block size;
    applying, by the processing device, the filter to the second set of data blocks in response to determining that the merge operation is to be performed; and
    generating, by the processing device, an encoding of the digital image in view of at least one of the first set of DCT blocks or the second set of DCT blocks.

2. The method of claim 1, wherein the first block size is less than the second block size and wherein a first number of DCT blocks in the first set of DCT blocks is greater than a second number of data blocks in the second set of data blocks.

3. The method of claim 1, wherein the first block size is greater than the second block size and wherein a first number of DCT blocks in the first set of DCT blocks is less than a second number of data blocks in the second set of data blocks.

4. The method of claim 1, wherein the transform function comprises a Walsh-Hadamard Transform (WHT) function.

5. The method of claim 1, wherein applying the filter to the first set of DCT blocks comprises:
modifying elements in alternate rows of the first set of DCT blocks.

6. The method of claim 5, wherein applying the filter to the first set of DCT blocks further comprises:
modifying elements in alternate columns of the first set of DCT blocks.

7. The method of claim 1, wherein applying the filter to the second set of data blocks comprises:
modifying elements in alternate rows of the second set of data blocks.

8. The method of claim 7, wherein applying the filter to the second set of data blocks further comprises:
modifying elements in alternate columns of the second set of data blocks.

9. The method of claim 1, wherein generating the second set of data blocks comprises:
rearranging elements of the first set of DCT blocks into the second set of data blocks.

10. An apparatus, comprising:
a memory to store a plurality of data blocks;
a processing device, operatively coupled to the memory, to:
obtain a first set of discrete cosine transform (DCT) blocks of a digital video, each DCT block from the first set of DCT blocks having a first block size;
determine whether to perform a merge operation or a split operation on the first set of DCT blocks;
apply a filter to the first set of DCT blocks in response to determining that a split operation is to be performed;
generate, using a transform function, a second set of data blocks in view of the first set of DCT blocks, each data block from the second set of data blocks having a second block size; and
generate an encoding of the digital video in view of at least one of the first set of DCT blocks or the second set of DCT blocks.

11. The apparatus of claim 10, wherein the first block size is greater than the second block size and wherein a first number of DCT blocks in the first set of DCT blocks is less than a second number of data blocks in the second set of data blocks.

12. The apparatus of claim 10, wherein the transform function comprises a Walsh-Hadamard Transform (WHT) function.

13. The apparatus of claim 10, wherein the processing device is to apply the filter to the first set of DCT blocks by:
modifying elements in alternate rows of the first set of DCT blocks.

14. The apparatus of claim 13, wherein the processing device is to further apply the filter to the first set of DCT blocks by:
modifying elements in alternate columns of the first set of DCT blocks.

15. The apparatus of claim 10, wherein the processing device is to generate the second set of data blocks by:
rearranging elements of the first set of DCT blocks into the second set of data blocks.

16. A non-transitory computer readable storage medium having instructions that, when executed by a processing device, cause the processing device to:
obtain a first set of discrete cosine transform (DCT) blocks associated with digital audio, each DCT block from the first set of DCT blocks having a first block size;
generate, by the processing device, using a transform function, a second set of data blocks in view of the first set of DCT blocks, each data block from the second set of data blocks having a second block size;
determine, by the processing device, whether to perform a merge operation or a split operation on the second set of DCT blocks;
apply, by the processing device, the filter to the second set of data blocks in response to determining that a merge operation is to be performed; and
generate an encoding of the digital audio in view of at least one of the first set of DCT blocks or the second set of DCT blocks.

17. The non-transitory computer readable storage medium of claim 16, wherein the first block size is less than the second block size and wherein a first number of DCT blocks in the first set of DCT blocks is greater than a second number of data blocks in the second set of data blocks.

18. The non-transitory computer readable storage medium of claim 16, wherein the transform function comprises a Walsh-Hadamard Transform (WHT) function.

19. The non-transitory computer readable storage medium of claim 16, wherein the processing device to apply the filter to the second set of data blocks further comprises the processing device to:
modify elements in alternate rows of the second set of data blocks.

20. The non-transitory computer readable storage medium of claim 19, wherein the processing device to apply the filter to the second set of data blocks further comprises the processing device to:
modify elements in alternate columns of the second set of data blocks.

* * * * *